June 8, 1965 R. J. BERTA 3,187,937
LOW TEMPERATURE STORAGE APPARATUS
Filed April 12, 1962
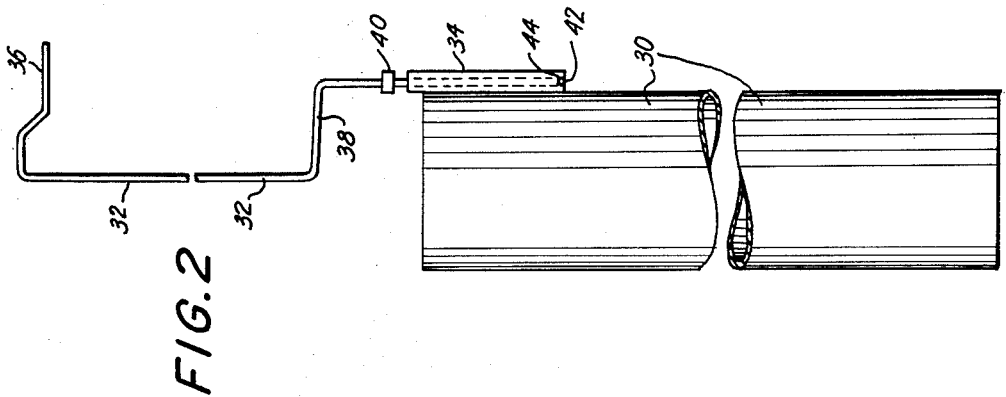
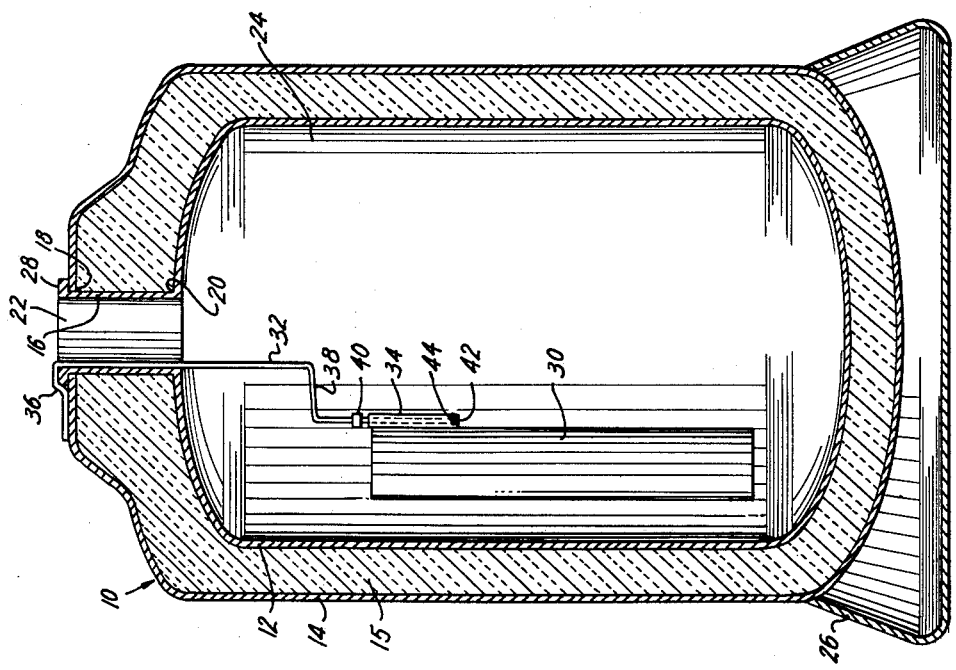
INVENTOR.
REMO J. BERTA
BY
Richard S. Shreve, Jr.
ATTORNEY

United States Patent Office 3,187,937
Patented June 8, 1965

3,187,937
LOW TEMPERATURE STORAGE APPARATUS
Remo J. Berta, Indianapolis, Ind., assignor to Union
Carbide Corporation, a corporation of New York
Filed Apr. 12, 1962, Ser. No. 187,041
3 Claims. (Cl. 220—94)

This invention relates to an improved apparatus for storing and conveying perishable commodities at low temperatures. It relates more particularly to a portable storage system which enables an increased amount of the available container storage space to be utilized as compared with prior art apparatus.

In the past, several difficulties have been encountered with apparatus intended to store perishable commodities, such as bovine semen and biologicals, at low temperatures for sustained periods of time. One of the important difficulties was concerned with the amount of material that could be stored in and removed from a given storage container. Since the stored material must pass through the access passage of the container, the passage dimensions generally determine the maximum size of a given storage receptacle. One storage method commonly practiced was to provide a suitable receptacle with an elongated hook fixed thereto and extending upwardly therefrom which hook could engage the lip of the container access opening and thereby support the receptacle within the storage area. A given receptacle could thus be retrieved and reinserted by means of the hook member.

While this storage means is quite useful, it has some disadvantages. First, a maximum of about six receptacles, each having a diameter slightly smaller than that of the access passage could be accommodated. Since a storage container usually has an overall storage area diameter greater than that of its access passage and it is essential for minimum heat leak to have a minimum diameter access passage, a substantial portion of the available storage space is thus not used by the receptacles when positioned therein.

A further organization disclosed by the prior art for such storage employs a "Lazy Susan" conveying means in conjunction with an offset access passage in the container. In this fashion, a large number of receptacles are supported on the "Lazy Susan" tray and sequentially rotated beneath the access passage to permit insertion or withdrawal. To conveniently store and retrieve the maximum number of receptacles in this type of container, the access passage must be quite large to provide access to several receptacles from its fixed location. This large access passage of course provides an increased heat leak to the storage container. Also the centrally located driving mechanism used to rotate the "Lazy Susan" tray introduces undesirable heat leak and is expensive and complicated.

It is an object of the present invention to provide improved apparatus for inserting and retrieving materials to and from a low temperature storage container. It is a further object to provide apparatus which minimizes heat leak therethrough into the container. Another object is to provide apparatus which more efficiently utilizes the container storage space. Another object is to provide means to visibly index the storage apparatus such that retrieval thereof may be effected without having to fish through a vapor cloud.

Other objects, features and advantages of the present invention will be readily apparent from the following detailed description of certain embodiments thereof, taken in conjunction with the accompanying drawings in which:

FIGURE 1 is a view in vertical cross-section of a storage container which illustrates principles of the present invention.

FIGURE 2 is a vertical view of a canister which illustrates principles of the present invention.

While the present invention could be employed in conjunction with various types of insulated storage containers, it is most useful with portable double-walled container with an evacuated insulation space between the walls and a centrally located access opening having a diameter which is substantially smaller than the inner vessel. For illustrative purposes, the following description will be confined to the use of the present invention in such a double-walled container.

Briefly, the invention contemplates an insulated container for storing materials at low temperatures which comprises an outer shell, a vessel inwardly spaced therefrom defining a central storage area and having access means thereto. A plurality of material holding means are provided, each of which generally comprises a material canister rotatably connected to a handle such that the canister may be offset toward the inner vessel wall after insertion into the container.

It is preferred that the canister handle suspend the canister through the mouth of the container although support means disposed in the interior of the inner vessel such as a rim attached to the upper portion of the inner vessel may also be suitable.

As shown in FIGURE 1, a storage vessel 10 for low temperature materials comprises an inner vessel 12 and an outer shell 14 outwardly spaced therefrom to define an evacuated insulation space 15 therebetween. The inner vessel and outer shell are preferably fabricated from aluminum or stainless steel. A cylindrical neck-tube 16 is leak-tightly attached to the outer shell and inner vessel at joints 18 and 20 respectively for forming an access passage 22 terminating in a port to the storage compartment 24 of the inner vessel. A foot-ring 26 fixed to the outer shell 14, supports the entire container in a substantially upright position. An index ring 28, adjacent the container top permits each material holding canister to be easily identified. This ring functions to identify the contents and location of any specific storage receptacle within the container.

According to the invention and with reference to FIGURE 1, a canister 30 is rotatably connected to a canister handle 32 through a hinge 34. To vertically suspend the canister 30 from the mouth of container 10, handle 32 preferably has a hook-shaped upper portion 36 which supports the entire canister assembly from the top of the neck tube 16. The lower portion of handle 32 includes a laterally extending segment 38, a stop 40 and a hooked-end 42, all of which will be described in greater detail subsequently.

Handle 32 is preferably constructed of a low-thermally conductive material such as a reinforced thermosetting plastic but may also be constructed of a stainless steel or aluminum. If the latter materials are employed, a segment of handle 32 may be constructed of plastic to short circuit the heat leak along the handle.

Hinge 34 preferably comprises a thin-walled cylindrical tube having a sufficiently large inner diameter to receive handle 32. As shown in FIGURE 2, hinge 34 has a slot 44 in the lower end of the cylinder to receive the hooked-end 42 of handle 32 thereby securing the handle in place after it has been properly positioned. The hinge may be connected to the outer surface of canister 30 by tack welding, for example.

To insert the canister assembly into the container, handle 32 is rotated to the position shown in FIGURE 2 with the laterally extending segment 38 positioned above the canister 30 such that the hooked-end 42 of the handle engages slot 44 in the lower end of hinge 34. The canister assembly is then lowered into the container until the canister 30 rests on the bottom of inner vessel 12 or on means (not shown) suitably positioned therefor on the inner vessel bottom.

Handle 32 is then disengaged from hinge 34 by lowering to release hooked-end 42 from slot 44. Stop 40 prevents lowering the handle further than is necessary to release hooked-end 42 from slot 44. The handle is rotated 180° to the position shown in FIGURE 1 and raised so that hooked-end 42 re-engages slot 44. The canister assembly is then offset toward the inner surface of inner vessel 12 and suspended from the top of the container as shown in FIGURE 1.

The diameter of the canister 30 and the length of the laterally extending segment 38 of handle 32 must be slightly less than the inside diameter of neck tube 16 so that the canister assembly may be inserted into the container as previously described. Also, the combined length of the handle and the canister should be such that the suspended canister assembly will clear the bottom of inner vessel 12.

The access passage 22 of the insulated container is usually substantially closed by means of a loose-fitting low heat conductive neck tube plug (not shown) having grooves cut into its outer wall for mating the handle 32. This insulating member may be removed whenever a receptacle is inserted or withdrawn.

While the apparatus herein disclosed has been described in detail, it will be understood that modifications and changes can be made to the above described apparatus without departing from the spirit and scope of the invention.

What is claimed is:

1. A canister assembly, so constructed and arranged to be suspended from the top rim of a centrally-located top access passage to the storage area of a thermally insulated storage container, which comprises: a handle and a cylindrical canister rotatably hinged to a lower portion of said handle such that said canister may be laterally offset within the container interior, said handle comprising a hooked-shaped upper portion for engaging the top rim portion of such container, a laterally-extending intermediate portion located above said canister and a vertical straight portion below the offset having a hooked-shaped lower end; and means connected to the outer surface of said canister for rotatably connecting said handle to said canister which comprises a thin-walled cylindrical tube having its axis parallel to the axis of the canister and slidably receiving and enclosing a portion of the vertical portion of said handle and having a slot in the lower end thereof for receiving the hooked-end of said handle to secure the handle against rotation relative to the cylindrical tube.

2. A canister assembly, so constructed and arranged to be suspended from the top rim of a top access passage to the storage area of a thermally insulated storage container, which comprises: a tubular canister having a side wall; a handle having a hooked-shaped upper portion for engaging said top rim of the container and a laterally-extending intermediate segment located above said tubular canister and joined to a hooked lower end by a vertical straight segment; and means connected to said side wall of said tubular canister at least partially enclosing and slidably receiving said straight segment of said handle such that said handle is only rotatable about an axis parallel to the longitudinal axis of said tubular canister and slidable longitudinally of said tubular canister, said means having a slot at its lower end to slidably and nonrotatably receive said hooked lower end of said handle to secure said handle against rotation relative to said tubular canister.

3. A canister according to claim 1 wherein said handle is constructed of a low thermally conductive material.

References Cited by the Examiner

UNITED STATES PATENTS

| 1,813,190 | 7/31 | Morin. | |
| 2,381,253 | 8/45 | Bierwert | 220—17 X |
| 2,908,468 | 10/59 | Thomas | 220—96 X |
| 3,052,370 | 9/62 | Haumann et al. | 220—17 |

FOREIGN PATENTS 824,702   12/59   Great Britain.

THERON E. CONDON, *Primary Examiner.*